US012617472B2

(12) United States Patent
Hwang et al.

(10) Patent No.:  US 12,617,472 B2
(45) Date of Patent:       May 5, 2026

(54) LOCKING UNIT FOR VEHICLE

(71) Applicants: Hyundai Motor Company, Seoul
(KR); Kia Corporation, Seoul (KR)

(72) Inventors: Jin Ho Hwang, Cheonan-si (KR);
Dong Eun Cha, Hwaseong-si (KR);
Sang Heon Lee, Seoul (KR)

(73) Assignees: Hyundai Motor Company, Seoul
(KR); Kia Corporation, Seoul (KR)

( * ) Notice: Subject to any disclaimer, the term of this
patent is extended or adjusted under 35
U.S.C. 154(b) by 392 days.

(21) Appl. No.: 18/217,778

(22) Filed: Jul. 3, 2023

(65) Prior Publication Data

US 2023/0347989 A1      Nov. 2, 2023

Related U.S. Application Data

(63) Continuation of application No. 17/506,053, filed on
Oct. 20, 2021, now abandoned.

(30) Foreign Application Priority Data

Apr. 27, 2021      (KR) ......................... 10-2021-0054301

(51) Int. Cl.
B60N 2/015          (2006.01)
B62D 25/20          (2006.01)
(52) U.S. Cl.
CPC ......... B62D 25/20 (2013.01); B60N 2/01516
(2013.01)
(58) Field of Classification Search
CPC ............... B62D 25/20; B60N 2/01516; B60N
2/01525; B60N 2/0155; B60N 2/01558;
(Continued)

(56) References Cited

U.S. PATENT DOCUMENTS 5,326,067  A  *  7/1994  Gonzalez  ...........  B60N 2/01583
                                                      297/440.22
6,312,037  B1 * 11/2001  Garrido  ..............  B60N 2/01558
                                                      296/65.13
(Continued)

FOREIGN PATENT DOCUMENTS

CN          119176063  A  *  12/2024  .........  B60N 2/01516
FR          2 855 467  A1      12/2004
(Continued)

OTHER PUBLICATIONS

Office Action issued on Apr. 21, 2025 in corresponding Korean
patent application No. 10-2021-0054301.

*Primary Examiner* — Amy R Weisberg
*Assistant Examiner* — Wenwei Zhuo
(74) *Attorney, Agent, or Firm* — Morgan, Lewis &
Bockius LLP

(57) ABSTRACT

A locking unit of a vehicle may include a mounting portion
having a plurality of mounting grooves formed on an upper
surface thereof, wherein supporting legs of a vehicle interior
portion are configured to be inserted into the mounting
grooves, installing the vehicle interior portion in the indoor
compartment of the vehicle; and a plurality of locking
devices provided on inner peripheries of the mounting
grooves inside the mounting portion, respectively, such that,
by selectively fixing or unfixing the supporting legs of the
vehicle interior portion inserted in the mounting grooves, the
vehicle interior portion is attached to or detached from the
mounting portion.

4 Claims, 4 Drawing Sheets

(Locking condition)

(58) Field of Classification Search
    CPC ............... B60N 2/01533; B60N 2/919; B60N
                                2002/952; B60N 2002/924
    USPC ................................... 296/193.07, 65.03, 63
    See application file for complete search history.

(56)                        References Cited

U.S. PATENT DOCUMENTS

| | | | | |
|---|---|---|---|---|
| 6,840,703 | B2 * | 1/2005 | Blanchard ............. | F16B 19/109 |
| | | | | 403/322.2 |
| 8,010,255 | B2 | 8/2011 | Darraba | |
| 9,517,712 | B1 | 12/2016 | Masanek, Jr. et al. | |
| 10,773,784 | B2 | 9/2020 | Huber et al. | |
| 11,584,259 | B2 * | 2/2023 | Cantos ................... | B60N 2/005 |
| 2012/0219352 | A1 | 8/2012 | Schmidt et al. | |
| 2020/0047643 | A1 | 2/2020 | Ellis et al. | |
| 2022/0063452 | A1 * | 3/2022 | Hwang ................. | B60N 2/919 |
| 2022/0340211 | A1 * | 10/2022 | Hwang ................. | B62D 25/20 |

FOREIGN PATENT DOCUMENTS

| | | | | | |
|---|---|---|---|---|---|
| GB | 971537 | A | | 9/1964 | |
| KR | 19980051813 | U | * | 10/1998 | ........... B60N 2/0155 |
| KR | 10-1998-0075948 | A | | 11/1998 | |
| KR | 10-2005-0112829 | A | | 12/2005 | |
| KR | 10-2006-0017306 | A | | 2/2006 | |
| KR | 10-2006-0024908 | A | | 3/2006 | |
| KR | 10-2011-0051626 | A | | 5/2011 | |
| WO | WO-2025104580 | A1 | * | 5/2025 | ......... B60N 2/01516 |

\* cited by examiner

FIG. 3A
FIG. 3B
[When mounted]
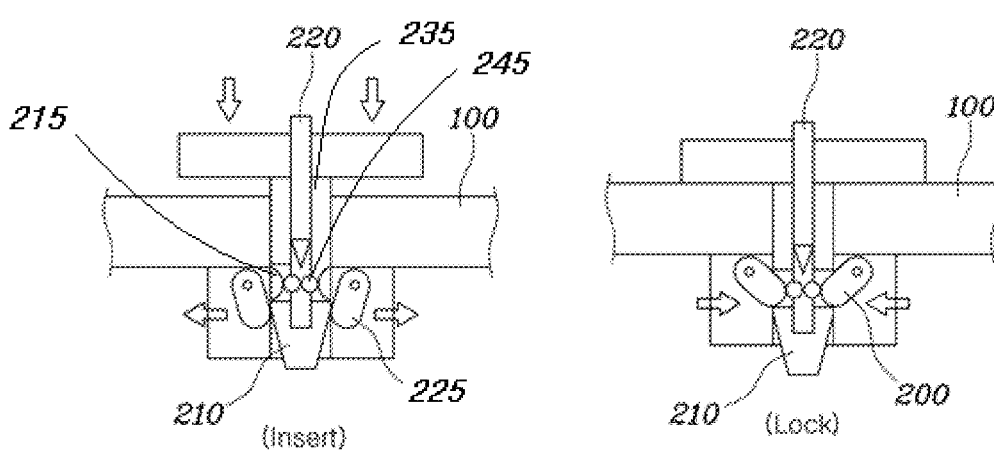
(Insert)
(Lock)
FIG.3C
FIG. 3D
[When separated]
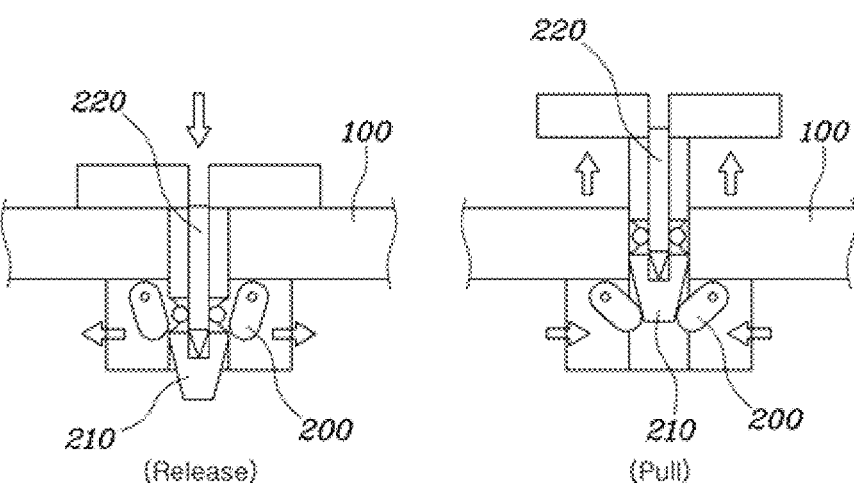
(Release)
(Pull)

(Unlocking condition)

(Locking condition)

LOCKING UNIT FOR VEHICLE

CROSS REFERENCE TO RELATED APPLICATION

This application is the continuation application of U.S. patent application Ser. No. 17/506,053 filed on Oct. 20, 2021, which claims priority to Korean Patent Application No. 10-2021-0054301, filed Apr. 27, 2021, the entire contents of which is incorporated herein for all purposes by this reference.

BACKGROUND OF THE INVENTION

Field of the Invention

The present invention relates to a locking unit of a vehicle, wherein the locking unit is configured such that an internal portion provided in the indoor space of a purpose-built vehicle (PBV) according to the purpose of the vehicle can be freely installed on the floor thereof and uninstalled therefrom.

Description of Related Art

Conventional vehicles have only played the role of transportation means, but recent development of autonomous driving technologies has enabled passengers in vehicles to engage in more diversified activities other than driving.

Fully autonomous driving technologies (requiring no driver intervention) are still under development but, if fully commercialized later, will transition vehicles to require no separate driving seats and to have indoor spaces that are more freely modifiable.

Such autonomous driving technologies have been followed by emergence of purpose-built vehicles (PBV) which may be used by passengers for specific purposes. Unlike conventional vehicles, PBVs require indoor items appropriate for the purposes thereof. For example, a bed may be necessary for sleeping, and a chair and a table may be necessary for a work.

Therefore, PBVs will require internal portions which may be freely moved to desired locations inside the vehicles, or internal portions appropriate for the purposes will need to be attached/detached. This requires development of a locking unit for a vehicle, which enables an internal portion to be easily installed on the floor or uninstalled therefrom.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a locking device for a vehicle, wherein a support leg of a vehicle interior portion necessary for the indoor compartment of the vehicle is inserted into a mounting portion such that, by fixing or unfixing the support leg, the vehicle interior portion may be attached to or detached from the mounting portion.

In accordance with an aspect of the present invention, a locking unit of a vehicle includes: a mounting portion having a plurality of mounting grooves formed on an upper surface thereof, wherein supporting legs of a vehicle interior portion are configured to be inserted into the mounting grooves, installing the vehicle interior portion in the indoor compartment of the vehicle; and a plurality of locking devices provided on inner peripheries of the mounting grooves inside the mounting portion, respectively, such that, by selectively fixing or unfixing the supporting legs of the vehicle interior portion inserted in the mounting grooves, the vehicle interior portion is attached to or detached from the mounting portion.

The vehicle interior portion may include a seat or a table, and one or more supporting legs may be provided on a lower end portion of the seat or the table.

The mounting portion may include one or more panels, and the one or more panels may be coupled to the upper surface of a vehicle floor to form a portion of a floor.

A locking groove may be formed on an external circumferential surface of each of the supporting legs of the vehicle interior portion, a locking protrusion may be provided on a side of each of the locking devices to be adjacent to the locking groove, and each of the locking devices may selectively insert the locking protrusion into the locking groove such that the supporting legs of the vehicle interior portion inserted into the mounting grooves are selectively fixed or unfixed.

An actuator connected to the locking protrusion may be provided at a side of each of the locking devices, and each of the locking devices may selectively insert the locking protrusion into the locking groove by moving the locking protrusion forward toward the locking groove or backward through the actuator.

Each of the locking devices may insert the locking protrusion into the locking groove through elastic force when the supporting legs are inserted in the mounting grooves, each of the supporting legs may have a release portion provided at a side of the locking groove, and the release portion may push the inserted locking protrusion to the outside thereof and thus unfix the supporting legs of the vehicle interior portion inserted into the mounting grooves.

A magnetic force portion connected to the locking protrusion may be provided at a side of each of the locking devices, and each of the locking devices may attach or detach the locking protrusion to or from the locking groove through magnetic force and thus selectively insert the locking protrusion into the locking groove.

The magnetic force portion may include a fixation magnet, a rotating magnet, and an electromagnet, the magnetic force portion may have a magnetic path changed according to the magnetism change of the electromagnet, the supporting legs may be fixed when the magnetic force portion and each of the supporting legs together form the magnetic path, and the supporting legs may be unfixed when only the magnetic force portion forms the magnetic path.

A cover portion configured to cover each of the mounting grooves may be provided at the upper end portion of each of the mounting grooves of the mounting portion, and the cover portion may be removed when the vehicle interior portion is provided in the indoor compartment of the vehicle.

A locking device for a vehicle according to various exemplary embodiments of the present invention makes it possible to insert a support leg of a vehicle interior portion necessary for the indoor compartment of the vehicle into a mounting portion such that, by fixing or unfixing the support leg, the vehicle interior portion may be attached to or detached from the mounting portion. Furthermore, the vehicle interior portion may be freely moved and reinstalled in the indoor compartment of the vehicle as needed.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3A, FIG. 3B, FIG. 3C and FIG. 3D are side views showing a locking device of a locking unit for a vehicle according to various exemplary embodiments of the present invention.

Figure 1:
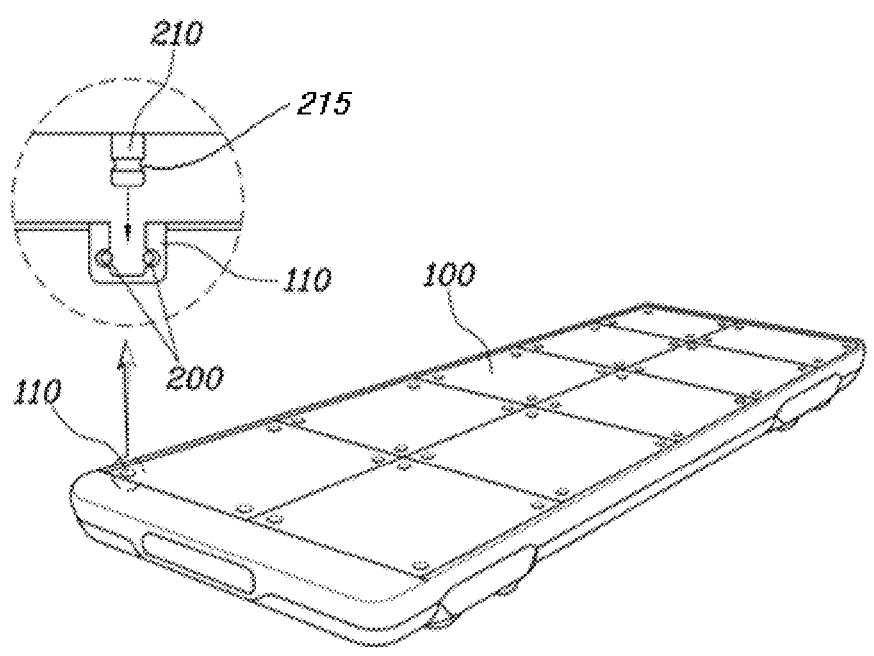
FIG. 1 is a view showing a locking unit for a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 2A:
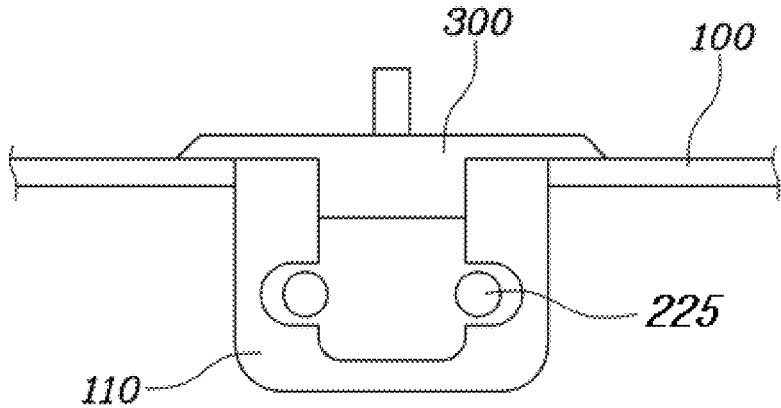
FIG. 2A and FIG. 2B are a side view and a plan view showing a locking device of a locking unit for a vehicle according to various exemplary embodiments of the present invention.
Figure 2B:
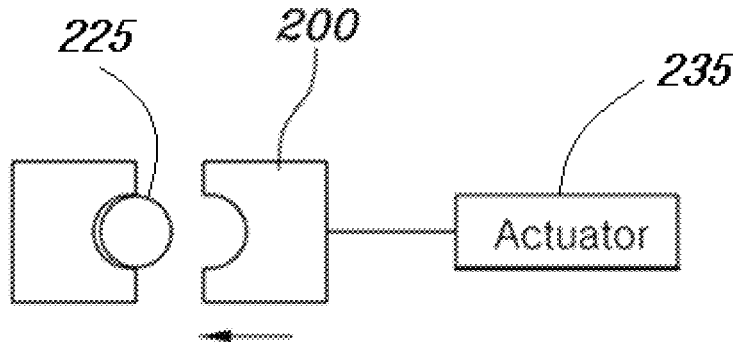
Figure 4A:
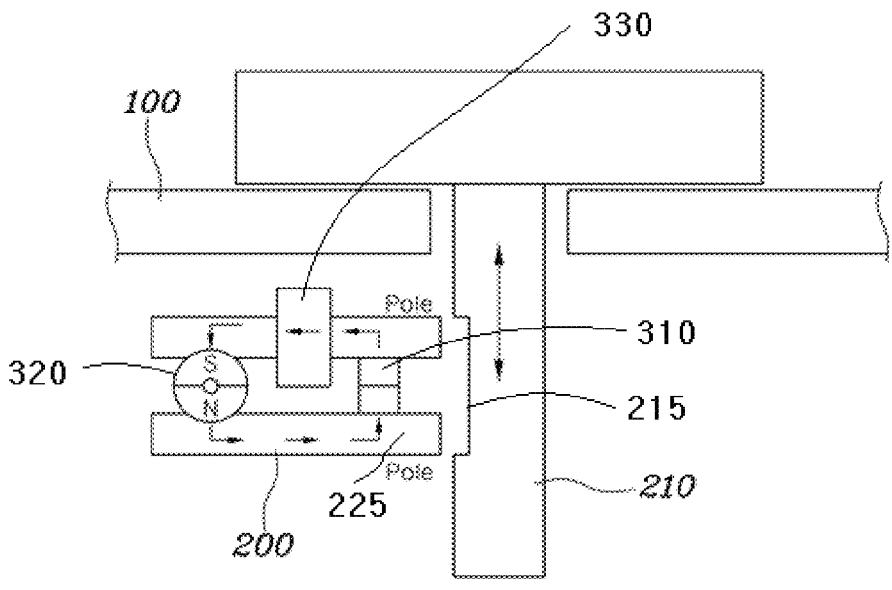
FIG. 4A and FIG. 4B are side views showing a locking device of a locking unit for a vehicle according to various exemplary embodiments of the present invention.
Figure 4B:
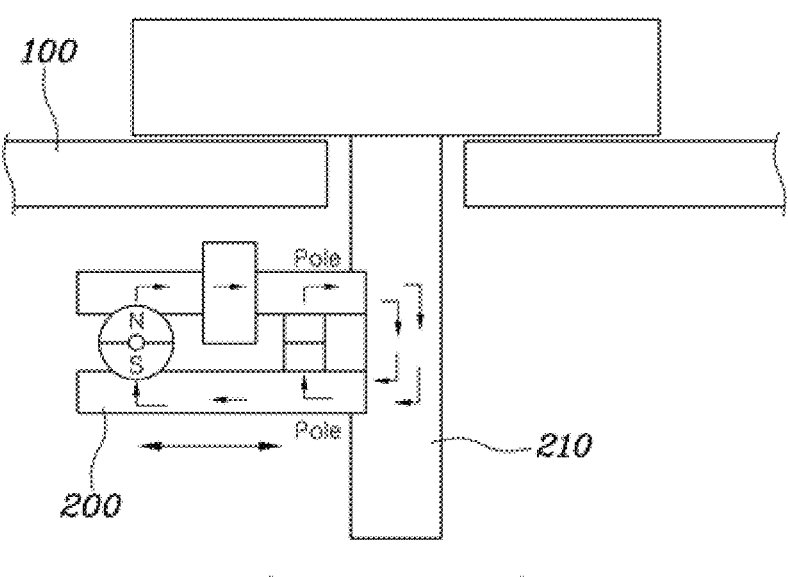

FIG. 1 is a view showing a locking unit for a vehicle according to various exemplary embodiments of the present invention. FIG. 2A and FIG. 2B are a side view and a plan view showing a locking device of a locking unit for a vehicle according to various exemplary embodiments of the present invention. FIG. 3A, FIG. 3B, FIG. 3C and FIG. 3D are side views showing a locking device of a locking unit for a vehicle according to various exemplary embodiments of the present invention. FIG. 4A and FIG. 4B are side views showing a locking device of a locking unit for a vehicle according to various exemplary embodiments of the present invention.

FIG. 1 is a view showing a locking unit of a vehicle according to various exemplary embodiments of the present invention. A locking unit for a vehicle according to various exemplary embodiments of the present invention includes: a mounting portion 100 having a plurality of mounting grooves 110 formed on the upper surface thereof such that supporting legs 210 of the vehicle interior portion are inserted into the mounting grooves 110, installing the vehicle interior portion in the indoor compartment of the vehicle; and a plurality of locking devices 200 provided on the peripheries of the mounting grooves 110 inside the mounting portion 100, respectively, such that, by selectively fixing or unfixing the supporting legs 210 of the vehicle interior portion inserted into the mounting grooves 110, the vehicle interior portion is attached to or detached from the mounting portion 100.

The vehicle interior portion may include a seat or a table, and one or more supporting legs 210 may be provided on a lower end portion of the seat or the table. The mounting portion 100 may include one or more panels, and the one or more panels may be coupled to the upper surface of a vehicle floor to form a portion of a floor.

The vehicle interior portion may be freely provided according to an activity purpose of a passenger in the indoor space of a purpose-built vehicle (PBV), and the one or more panels may form a portion of the floor on a vehicle floor. The supporting legs 210 formed on the lower end portion of the vehicle interior portion may be inserted in some mounting grooves 110 among the plurality of mounting grooves 110 formed on the upper surface of the panels and the vehicle interior portion may be thus provided at a position according to a purpose or a position desired by a passenger.

For example, the purpose of a PBV may be movement, rest, sleep, read, exercise, shopping, business, or the like, and accordingly, a vehicle interior portion provided in the indoor space of a PBS may include a seat, a table, a bed, a bookcase, an exercise equipment, or the like. The above-mentioned items may be freely provided at a desired position in the indoor space of a vehicle through the locking unit according to various exemplary embodiments of the present invention, and be easily attached thereto or detached therefrom to promote convenience of a passenger.

FIG. 2A and FIG. 2B are a side view and a plan view showing a locking device of a locking unit for a vehicle according to various exemplary embodiments of the present invention. According to a locking unit for a vehicle according to various exemplary embodiments of the present invention, a locking groove 215 is formed on an external circumferential surface of each of the supporting legs 210 of the vehicle interior portion, and a locking protrusion 225 is formed on a side of each of the locking devices 200 to be adjacent to the locking groove 215. Each of the locking devices 200 selectively inserts the locking protrusion 225 into the locking groove 215 and thus selectively fixes or unfixes the supporting legs 210 of the vehicle interior portion inserted into the mounting grooves 110.

Furthermore, according to a locking unit for a vehicle according to various exemplary embodiments of the present invention, an actuator 235 coupled to the locking protrusion 225 is provided at a side of each of the locking devices 200, and each of the locking devices 200 may move forward the locking protrusion 225 toward the locking groove 215 and thus selectively inserts the locking protrusion 225 into the locking groove.

The supporting legs 210 provided on the lower end portion of the vehicle interior portion may be inserted in the mounting grooves 110, which are positioned at desired positions, among the plurality of mounting grooves 110 formed on the mounting portion 100, and instead of being merely inserted therein, need to be fixed such that, after being inserted, the same is not uninstalled inadvertently. Therefore, the locking groove 215 for the fixation is provided on the external circumferential surface of each of the supporting legs 210, and each of the locking devices 200 fits and inserts the locking protrusion 225 into the locking groove 215 and thus securely fixes the vehicle interior portion to prevent the vehicle interior portion from being separated from the mounting portion 100 upwards.

The locking protrusion 225 may be configured as a panel, a bearing, or the like, which is fitted in the locking groove 215 and thus fixes the supporting legs. The locking protrusion, by the actuator, may move forward toward the locking groove 215 to fix the supporting legs 210 or move backward to unfix the supporting legs 210.

Meanwhile, according to a locking unit for a vehicle according to various exemplary embodiments of the present invention, a cover portion 300 for covering each of the mounting grooves 110 may be provided above the upper end portion of each of the mounting grooves 110 of the mounting portion 100, and the cover portion 300 may be removed when the vehicle interior portion is provided in the indoor compartment of the vehicle. In other words, each of the mounting grooves 110 formed on the mounting portion 100 is covered by the cover portion 300 when not being used to prevent inflow of foreign substances and the like, and the cover portion is removed when the mounting grooves are used and the mounting grooves 110 are thus opened to allow the supporting legs 210 to be inserted therein.

FIG. 3A, FIG. 3B, FIG. 3C and FIG. 3D are side views showing a locking device of a locking unit for a vehicle according to various exemplary embodiments of the present invention, and FIG. 4A and FIG. 4B are side views showing a locking device of a locking unit for a vehicle according to various exemplary embodiments of the present invention. According to a locking unit for a vehicle according to various exemplary embodiments of the present invention, each of the locking devices 200 inserts the locking protrusion 225 into the locking groove 215 through elastic force when the supporting legs 210 are inserted in the mounting grooves 110. Each of the supporting legs 210 has a release portion 220 provided at a side of the locking groove, and the release portion 220 pushes the inserted locking protrusion 225 to the outside and thus can unfix the supporting legs 210 of the vehicle interior portion inserted in the mounting grooves 110.

In an exemplary embodiment of the present invention, the supporting leg 210 includes a channel 235 through which the release portion 220 is slidable.

Referring to FIG. 3A, FIG. 3B, FIG. 3C, and FIG. 3D, the locking protrusion 225 protrudes toward the internal circumferential surface of each of the mounting grooves 110, and a portion of the locking protrusion 225 is hinge-fixed so that the locking protrusion 225 can rotate around a hinge shaft by elastic force. When the supporting legs 210 are inserted therein, the end portion of each of the supporting legs overcomes the elastic force of the locking protrusion 225 and thus pushes the locking protrusion 225 to the outside, and when the locking groove 215 is adjacent to the locking protrusion 225 by sufficient insertion of the supporting legs 210, the locking protrusion 225 returns to an original position thereof by the elastic force and is thus inserted in the locking groove 215, whereby the supporting legs 210 are fixed.

Furthermore, the release portion 220 is provided in each of the supporting legs 210 and is disposed in the longitudinal direction thereof. When the release portion 220 is pressed to the lower end portion thereof, the release portion pushes the locking protrusion 225 from the locking groove 215 by overcoming the elastic force, and the supporting legs 210 are thus unfixed, whereby the supporting legs 210 may be separated from the mounting grooves 110.

In an exemplary embodiment of the present invention, a release member 245 is mounted in the channel 235 and when an end tip of the release portion 220 presses the release member 245, the release member 245 moves in a radial direction of the channel 235 to push the locking protrusion 225 so as to release the locking protrusion 225 from the locking groove 215.

Meanwhile, according to a locking unit for a vehicle according to various exemplary embodiments of the present invention, a magnetic force portion may be provided in a side of each of the locking devices 200. Each of the locking devices 200 attaches or detaches the locking protrusion 225 to or from the locking groove 215 through magnetic force of the magnetic force portion, and can selectively insert the locking protrusion 225 into the locking groove.

Furthermore, the magnetic force portion may include a fixation magnet 310, a rotating magnet 320, and an electromagnet 330, and a magnetic path thereof is changed according to magnetism change of the electromagnet. The supporting legs 201 may be fixed when the magnetic force portion and each of the supporting legs 210 together form the magnetic path, and the supporting leg 210 may be unfixed when only the magnetic force portion forms the magnetic path.

This corresponds to a locking scheme using a magnetic module, and ease locking and unlocking is implemented only by changing the magnetism of the electromagnet through electric current. By the magnetism of the electromagnet, when the magnetic path is formed only in the magnetic force portion as shown in the upper picture of FIG. 4A and FIG. 4B, each of the locking devices 200 is not attached to the supporting leg 210. When the direction of the magnetic field flowing through the electromagnet is changed due to the magnetism change of the electromagnet in a case where the locking protrusion 225 is inserted in the locking groove 215 as shown in the lower picture in FIG. 4A, each of the supporting legs 210 functions as an amateur so that the magnetic path is formed together in the magnetic force portion and each of the supporting legs 210, and the locking protrusion 225 is thus securely fixed to the locking groove 215 by attractive force caused therefrom. Furthermore, a circular magnet can rotate according to the magnetism of the electromagnet to reinforce the magnetic path so that fixing force thereof is more strengthened.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A locking unit for a vehicle, the locking unit comprising:

a mounting portion having a plurality of mounting grooves formed on an upper surface thereof, wherein supporting legs of a vehicle interior portion are insertable into the plurality of mounting grooves; and a plurality of locking devices provided on inner peripheries of the plurality of mounting grooves inside the mounting portion, respectively, wherein by selectively fixing the supporting legs of the vehicle interior portion in the plurality of mounting grooves, the vehicle interior portion is selectively attached to the mounting portion, wherein a locking groove is formed on an external circumferential surface of each of the supporting legs of the vehicle interior portion, wherein a locking protrusion is provided on a side of each of the locking devices, wherein each of the locking devices selectively inserts the locking protrusion into the locking groove so that the supporting legs of the vehicle interior portion are selectively coupled to the plurality of mounting grooves, wherein a magnetic force portion connected to the locking protrusion is provided at the side of each of the locking devices, and wherein each of the locking devices selectively attaches the locking protrusion to the locking groove through magnetic force of the magnetic force portion so as to selectively insert the locking protrusion into the locking groove, wherein the magnetic force portion includes at least one of a fixation magnet, a rotating magnet, or an electromagnet, wherein the magnetic force portion has a magnetic path changed according to a magnetism change of the electromagnet, wherein the supporting legs are fixed to the plurality of mounting grooves when the magnetic force portion and each of the supporting legs together form the magnetic path, and wherein the supporting legs are unfixed from the plurality of mounting grooves when only the magnetic force portion forms the magnetic path.

2. The locking unit of claim 1, wherein the vehicle interior portion includes a seat or a table, and the supporting legs are provided on a lower end portion of the seat or the table.

3. The locking unit of claim 1, wherein the mounting portion includes one or more panels, and the one or more panels are coupled to an upper surface of a vehicle floor to form a portion of a floor.

4. The locking unit of claim 1, wherein the magnetic force portion include the rotating magnet and the electromagnet, and wherein the rotating magnet rotates according to a magnetism of the electromagnet to reinforce the magnetic path.

* * * * *